United States Patent
Blunier et al.

(10) Patent No.: US 10,813,269 B2
(45) Date of Patent: Oct. 27, 2020

(54) SYSTEM AND METHOD FOR REMOTELY CONTROLLING HYDRAULIC COMPONENTS OF AN AGRICULTURAL IMPLEMENT

(71) Applicant: CNH Industrial America LLC, New Holland, PA (US)

(72) Inventors: Timothy R. Blunier, Danvers, IL (US); John C. Endsley, Washington, IL (US)

(73) Assignee: CNH Industrial America LLC, New Holland, PA (US)

( * ) Notice: Subject to any disclaimer, the term of this patent is extended or adjusted under 35 U.S.C. 154(b) by 158 days.

(21) Appl. No.: 16/111,864

(22) Filed: Aug. 24, 2018

(65) Prior Publication Data

US 2020/0060066 A1    Feb. 27, 2020

(51) Int. Cl.
  *F15B 13/10*   (2006.01)
  *A01B 73/04*   (2006.01)
  (Continued)

(52) U.S. Cl.
  CPC .......... *A01B 73/044* (2013.01); *A01B 63/008* (2013.01); *A01B 63/22* (2013.01);
  (Continued)

(58) Field of Classification Search
  CPC ..... A01B 63/22; A01B 63/008; A01B 73/044; F15B 13/0426; F15B 13/10; F15B 2211/895
  See application file for complete search history.

(56) References Cited

U.S. PATENT DOCUMENTS 8,448,717 B2 * 5/2013 Adams .................. A01C 7/203
                                                     172/4
8,909,435 B2   12/2014 Tuttle et al.
(Continued)

FOREIGN PATENT DOCUMENTS

EP        2583543 A1    4/2013

OTHER PUBLICATIONS

Liquid Fertilizer Controller Operations Manual, ISOBUS Ammonia, SW Version Liquid v.01.00.04.00-ECUHW:1.6-1.7, Mar. 1, 2018, 56 Pages.

*Primary Examiner* — Abiy Teka
(74) *Attorney, Agent, or Firm* — Rebecca L. Henkel; Rickard K. DeMille

(57) ABSTRACT

A system for remotely controlling hydraulic component of an agricultural implement towed by a work vehicle may include a vehicle-based valve assembly that selectively supplies hydraulic fluid to one or more supply lines of the implement. Specifically, a first supply line may be fluidly coupled to an implement-based valve assembly that regulates the supply of hydraulic fluid to a hydraulic actuator through a first actuator line. A second supply line may be fluidly coupled to the first actuator line downstream of the implement-based valve assembly such that when a user provides a control input at a remote interface, the vehicle-based valve assembly may instead regulate the supply of hydraulic fluid to the actuator. The supply of the hydraulic fluid through the supply lines may additionally be controlled by first and second override valves fluidly coupled to the first and second supply lines, respectively.

20 Claims, 5 Drawing Sheets

(51) Int. Cl.
*F15B 13/042* (2006.01)
*A01B 63/22* (2006.01)
*A01B 63/00* (2006.01)
*A01B 3/24* (2006.01)
*A01B 49/02* (2006.01)

(52) U.S. Cl.
CPC .......... *F15B 13/0426* (2013.01); *F15B 13/10* (2013.01); *A01B 3/24* (2013.01); *A01B 49/02* (2013.01); *F15B 2211/5756* (2013.01); *F15B 2211/895* (2013.01)

(56) References Cited

U.S. PATENT DOCUMENTS

| | | | |
|---|---|---|---|
| 9,068,323 B2 * | 6/2015 | Peterson | E02F 3/432 |
| 9,078,392 B2 | 7/2015 | Van Buskirk et al. | |
| 9,510,498 B2 | 12/2016 | Tuttle et al. | |
| 9,622,399 B2 | 4/2017 | Kremmer et al. | |
| 2014/0129192 A1 | 5/2014 | Blank et al. | |
| 2018/0320714 A1 * | 11/2018 | Neef | F15B 13/0401 |
| 2020/0029485 A1 * | 1/2020 | Glennon | F15B 11/10 |
| 2020/0060064 A1 * | 2/2020 | Wu | F15B 13/10 |

* cited by examiner

SYSTEM AND METHOD FOR REMOTELY CONTROLLING HYDRAULIC COMPONENTS OF AN AGRICULTURAL IMPLEMENT

FIELD OF THE INVENTION

The present subject matter relates generally to agricultural implements, and more specifically, to a system for remotely controlling hydraulic components of an agricultural implement, as well as a related method for performing such remote control.

BACKGROUND OF THE INVENTION

A wide range of farm implements have been developed and are presently in use for tilling, planting, harvesting, and so forth. Tillers, for example, are commonly towed behind tractors and may cover wide swaths of ground to be prepared for planting. To make the tilling operation as efficient as possible, very wide swaths may be covered by extending wing assemblies on either side of a central frame section of the implement being pulled by the tractor. Typically, the central frame section and the wing assemblies include one or more toolbars, various ground-engaging tools mounted on the toolbar(s), and one or more associated support wheels. The wing assemblies are commonly disposed in a "floating" arrangement during the tilling operation, wherein hydraulic cylinders allow the implement to contact the soil with sufficient force to open the soil. For transport, the wing assemblies are elevated by the support wheels to disengage the ground-engaging tools from the ground and may optionally be folded, stacked, and/or pivoted to reduce the width of the implement.

To transition the wing assemblies from the transport position to the work position, a wing movement operation is performed in which the assemblies are moved via control of the operation of the associated hydraulic cylinders to allow the wing assemblies to be unfolded relative to the central frame section of the implement and subsequently lowered relative to the ground. A reverse operation may be performed to transition the wing assemblies from the work position to the transport position in which the wing assemblies are raised relative to the ground and subsequently folded towards the central frame section of the implement. Further operations, such as leveling of the implement relative to the ground, may be performed during operation in the work position.

In certain instances, agricultural implements include an implement controller configured to automatically control the hydraulic functions of the implement, without the ability to receive feedback from or provide feedback to a controller of the work vehicle. Given the potential for damage to the implement and/or to address any safety issues associated with obstacle collisions, it is important that the implement operations be capable of being controlled manually by the vehicle operator. However, without any communication between the implement controller and the controller of the work vehicle, there is a significant obstacle to overriding automatic implement-based control of the implement's hydraulic functions.

Accordingly, an improved system and related method for remotely controlling hydraulic components of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for remotely controlling hydraulic components of an agricultural implement. The system may generally include a vehicle-based valve assembly, an implement-based valve assembly, first and second supply lines, first and second override valves, and a first hydraulic actuator. The vehicle-based valve assembly may regulate a supply of hydraulic fluid to the agricultural implement through the first and second supply lines. Specifically, the hydraulic fluid may be supplied through the first supply line when a hydraulic system of the implement is operating in an automatic control mode and through the second supply line when a control input is received that overrides the automatic control mode. The implement-based valve assembly may be fluidly coupled to the first supply line to regulate the supply of the hydraulic fluid received via the first supply line to a first actuator line fluidly coupled to the first hydraulic actuator of the agricultural implement when in the automatic control mode. The second supply line may be fluidly coupled to the first actuator line downstream of the implement-based valve assembly. The first override valve may be supported on the agricultural implement and fluidly coupled to the first supply line between the vehicle-based valve assembly and the implement-based valve assembly. The second override valve may be supported on the agricultural implement and fluidly coupled to the second supply line between the vehicle-based valve assembly and the first actuator line. Additionally, when the implement is operating in the automatic control mode, the first and second override valves are actuated to respective positions such that the supply of the hydraulic fluid to the first hydraulic actuator through the first actuator line is regulated via the implement-based valve assembly. Alternatively, when the control input is received to override the automatic control mode, the first and second override valves are actuated to respective positions such that the supply of the hydraulic fluid to the first hydraulic actuator through the first actuator line is regulated by the vehicle-based valve assembly.

In another aspect, the present subject matter is directed to a method for remotely controlling hydraulic components of an agricultural implement towed by a work vehicle. The agricultural implement may generally include first and second supply lines configured to receive pressurized hydraulic fluid from a vehicle-based valve assembly of the work vehicle. The first supply line may be fluidly coupled to an implement-based valve assembly configured to regulate a supply of the hydraulic fluid supplied via the first supply line to a first actuator line fluidly coupled to a first hydraulic actuator of the agricultural implement. The second supply line may be fluidly coupled to the first actuator line downstream of the implement-based valve assembly. The agricultural implement may further include a first override valve fluidly coupled to the first supply line upstream of the implement-based valve assembly and a second override valve fluidly coupled to the second supply line. The method may generally include supplying the pressurized hydraulic fluid to the agricultural implement through the first supply line when operating in an automatic control mode such that the supply of the hydraulic fluid to the first actuator line is regulated by the implement-based valve assembly. The first override valve may be in an open position and the second override valve may be in a closed position when in the automatic control mode. The method may additionally include receiving a control input associated with transitioning control from the automatic control mode to a manual override mode. Additionally, the method may include supplying the pressurized hydraulic fluid to the agricultural implement through the second supply line when operating in the manual override mode such that the supply of the hydraulic fluid to the first actuator line is regulated by the vehicle-based valve assembly of the work vehicle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
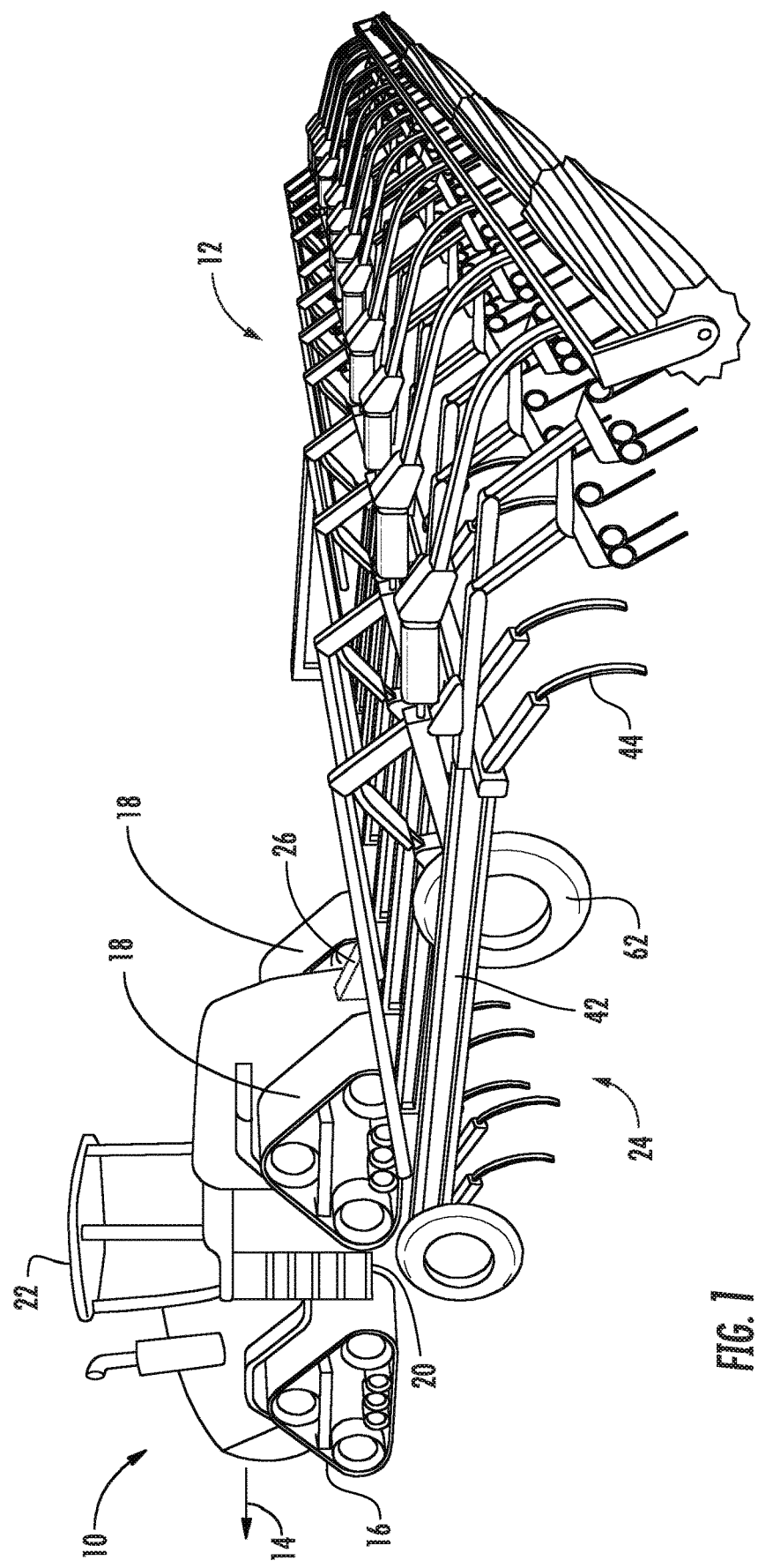
FIG. 1 illustrates a perspective view of one embodiment of a work vehicle towing an implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and method for remotely controlling hydraulic components of an agricultural implement. Specifically, in several embodiments, one or more hydraulic actuators (e.g., one or more lift, fold, and/or leveling cylinders) of an agricultural implement being towed by a work vehicle may be supplied pressurized fluid from a vehicle-based valve assembly through respective actuator lines. When a hydraulic system of the implement is operating in an automatic control mode, the pressurized fluid is supplied through a first supply line to an implement-based valve assembly that regulates the pressurized fluid provided to each respective actuator line. When a manual override mode or operation of the hydraulic system of the implement is requested, such as by an operator indicating such at a user interface located within the vehicle's cab, the flow of pressurized fluid is supplied and regulated by the vehicle-based valve assembly through a separate second supply line to the associated actuator line(s). Additionally, to allow for the system operation to be transitioned between the automatic control and manual override modes, the hydraulic system may include one or more implement-based override valves that are configured to be actuated between opened and closed positions to initiate or discontinue, respectively, the supply of hydraulic fluid through the various supply lines. As will be apparent from the description provided herein, the disclosed system allows the vehicle-based valve assembly to bypass the implement-based valve assembly such that the operator may override automatic implement-based control of the hydraulic system to manually (and remotely) control the operation of the implement (e.g., to control the implement's hydraulic actuators) without interference of the implement-based valve assembly and without any required communication or communicative interface between the vehicle and the implement.

Figure 2:
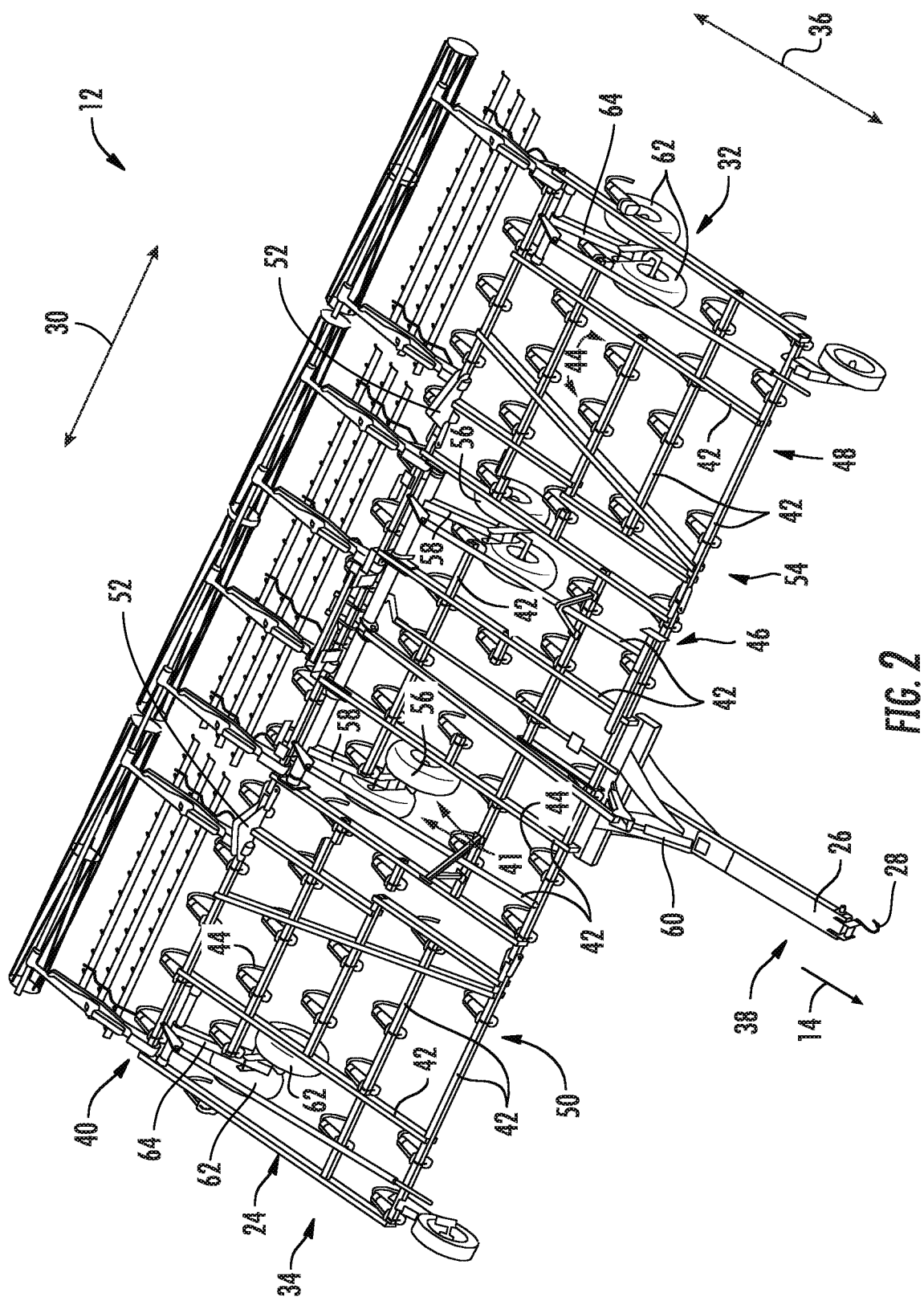
FIG. 2 illustrates a perspective view of the implement shown in FIG. 1, particularly illustrating wing assemblies of the implement located at their work position in accordance with aspects of the present subject matter.

Referring now to the drawings, FIGS. 1 and 2 illustrate several views of one embodiment of a work vehicle 10 and an associated agricultural implement 12 in accordance with aspects of the present subject matter. Specifically, FIG. 1 illustrates a perspective view of the work vehicle 10 towing the implement 12 along a direction of travel (e.g., as indicated by arrow 14), with the implement 12 being unfolded into a work position. As shown in the illustrated embodiment, the work vehicle 10 is configured as an agricultural tractor. However, in other embodiments, the work vehicle 10 may be configured as any other suitable agricultural vehicle.

As particularly shown in FIG. 1, the work vehicle 10 includes a pair of front track assemblies 16, a pair or rear track assemblies 18 and a frame or chassis 20 coupled to and supported by the track assemblies 16, 18. An operator's cab 22 may be supported by a portion of the chassis 20 and may house various input devices for permitting an operator to control the operation of one or more components of the work vehicle 10 and/or one or more components of the implement 12. Additionally, as is generally understood, the work vehicle 10 may include an engine (not shown) and a transmission (not shown) mounted on the chassis 20. The transmission may be operably coupled to the engine and may provide variably adjusted gear ratios for transferring engine power to the track assemblies 16, 18 via a drive axle assembly (not shown) (or via axles if multiple drive axles are employed).

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tires/wheels in lieu of the track assemblies 16, 18. Additionally, although the work vehicle 10 is shown in FIG. 1 as including the cab 22 for an operator, the work vehicle 10 may, instead, correspond to an autonomous vehicle, such as an autonomous tractor.

As particularly shown in FIG. 2, the implement 12 may, in one embodiment, correspond to a tiller or cultivator, configured to till or otherwise break the soil over which the implement 12 travels to create a seedbed. However, in other embodiments, the implement 12 may correspond to any other suitable agricultural implement, such as a seeder implement. As shown in the illustrated embodiment, the implement 12 may generally include a frame assembly 24 configured to be towed by the work vehicle 10 via a tow bar 26 in the travel direction 14 of the vehicle 10. For instance, the implement 12 may include a hitch assembly 28 coupled to the tow bar 26 that allows the implement 12 to be coupled to the work vehicle 10.

As shown in FIG. 2, the frame assembly 24 of the implement 12 may generally extend along a lateral direction (e.g., as indicated by arrow 30) between a first lateral side 32 and a second lateral side 34. The frame assembly 24 may further extend along a longitudinal direction (e.g., as indicated by the arrow 36), generally parallel to the direction of travel 14 (FIG. 1) between a forward end 38 and an aft end 40. The frame assembly 24 may generally include a plurality of structural frame members 42, such as beams, bars, and/or the like, configured to support or couple to a plurality of components, such as ground-engaging elements 44.

In several embodiments, the frame assembly 24 may include one or more frame sections. As illustrated in FIG. 2, for example, the frame assembly 24 may include a central frame section 46 positioned between the first and second lateral sides 32, 34 of the frame assembly 24. Moreover, the frame assembly 24 may also include a first wing section 48 positioned proximate to the first lateral side 32 of the frame assembly 24 and a second wing section 50 positioned proximate to the second lateral side 34 of the frame assembly 24. The first and second wing sections 48, 50 may generally be disposed along opposite lateral sides of the central frame section 46. In general, each wing section 48, 50 may be pivotally coupled to the central frame section 46 to allow the wing sections 48, 50 to be folded between their work position to their compact transport position. When in the compact transport position, the wing sections 48, 50 may be configured to extend generally perpendicular to the central frame section 46. However, it should be appreciated that the frame assembly 24 may include any other suitable number of frame sections, such as by including two or more wing sections along each lateral side of the central frame section 46.

As shown in the illustrated embodiment, wing actuators 52, such as hydraulic cylinders, may be coupled between each wing section 48, 50 and the central frame section 46 (and/or between each wing section 48, 50 and the tow bar 26, not shown) to facilitate folding and unfolding of the wing sections 48, 50 relative to the central frame section 46. For example, in one embodiment, at least one wing actuator 52 may be attached to each of the two wing sections 48, 50 in order to control the folding movement of the wing sections 48, 50. As is generally understood, each end of each wing actuator 52 may be connected to its respective component by a pin or other pivoting joint.

In one embodiment, the frame assembly 24 may be configured to support a cultivator 54, which may be configured to till or otherwise break the soil over which the implement 12 travels to create a seedbed. Specifically, the cultivator 54 may include a plurality of the ground-engaging tools 44, such as shanks, which are pulled through the soil as the implement 12 moves across the field in the direction of travel 14. As shown, the shanks 44 may be arranged so as to be spaced apart from one another across the implement 12. For example, at least some of the shanks 44 may be spaced apart from one another along the longitudinal direction 36 of the implement 12 between the forward and aft ends 38, 40 of the frame assembly 24. Similarly, at least some of the shanks 44 may be spaced apart from one another along the lateral direction 30 of the implement 12 between the first and second sides 32, 34 of the frame assembly 24. In this regard, each frame section 46, 48, 50 of the frame assembly 24 may be configured to support at least one of the shanks 44. For instance, one or more of the shanks 44 may be coupled to or supported by the main frame section 46 and/or while one or more other shanks 44 may be supported by each of the wing sections 48, 50 of the frame assembly 24.

The implement 12 may further include a central wheel assembly 56 disposed below and coupled to the central frame section 46 to support the central frame section 46 relative to the ground and to facilitate towing of the implement 12 in the direction of travel 14. As is generally understood, the central wheel assembly 56 may include at least one lift actuator 58 (e.g., a hydraulic cylinder) configured to extend and retract the wheel assembly 56 relative to the ground. For example, the lift actuator 58 may be configured to retract the central wheel assembly 56 relative to the ground when moving the implement 12 to its ground engaging or work position (e.g., as shown in FIG. 2). Additionally, the lift actuator 58 may be configured to extend the wheel assembly 56 towards the ground when moving the implement 12 to its compact transport position (not shown). Each of the at least one lift actuators 58 may further be configured to be actuated separately from others of the at least one lift actuator 58, such that the central frame section 46 may be leveled in the lateral direction 30. Further, as shown in FIG. 2, the central frame section 46 may include a leveling actuator 60 (e.g., a hydraulic cylinder) to perform leveling operations separately from or in addition to the wheel assembly 56.

As shown in FIG. 2, each wing section 48, 50 may also include one or more wing wheel assemblies 62 to facilitate lifting the wing sections 48, 50 relative to the ground. For example, the wing wheel assemblies 62 may be configured to be retracted to lower the wing sections 48, 50 to the work position. Similarly, the wing wheel assemblies 62 may be configured to be extended in an opposite extension direction to move the wing sections 48, 50 from the work position to a raised transport position. It should be appreciated that the extension and retraction of the wing wheel assemblies 62 may be controlled, for example using suitable wing wheel actuators 64 (e.g., hydraulic cylinders). The wing wheel actuators 64 may be configured to be controlled separately from the lift actuator 58 of the central frame section 46, such that the wing sections 48, 50 may be further leveled in the lateral direction 30 relative to the central frame section 46.

It should also be appreciated that the configuration of the implement 12 described above and shown in FIGS. 1 and 2 is only provided for exemplary purposes. Thus, it should be appreciated that the present subject matter may be readily adaptable to any manner of implement configuration. In particular, the present subject matter may be applicable to any suitable implement having wing assemblies configured to be actuated between a work position, at which the ground-engaging tools of the wing assemblies engage the ground, and a transport position, at which the ground-engaging tools of the wing assemblies are elevated above the ground.

Figure 3:
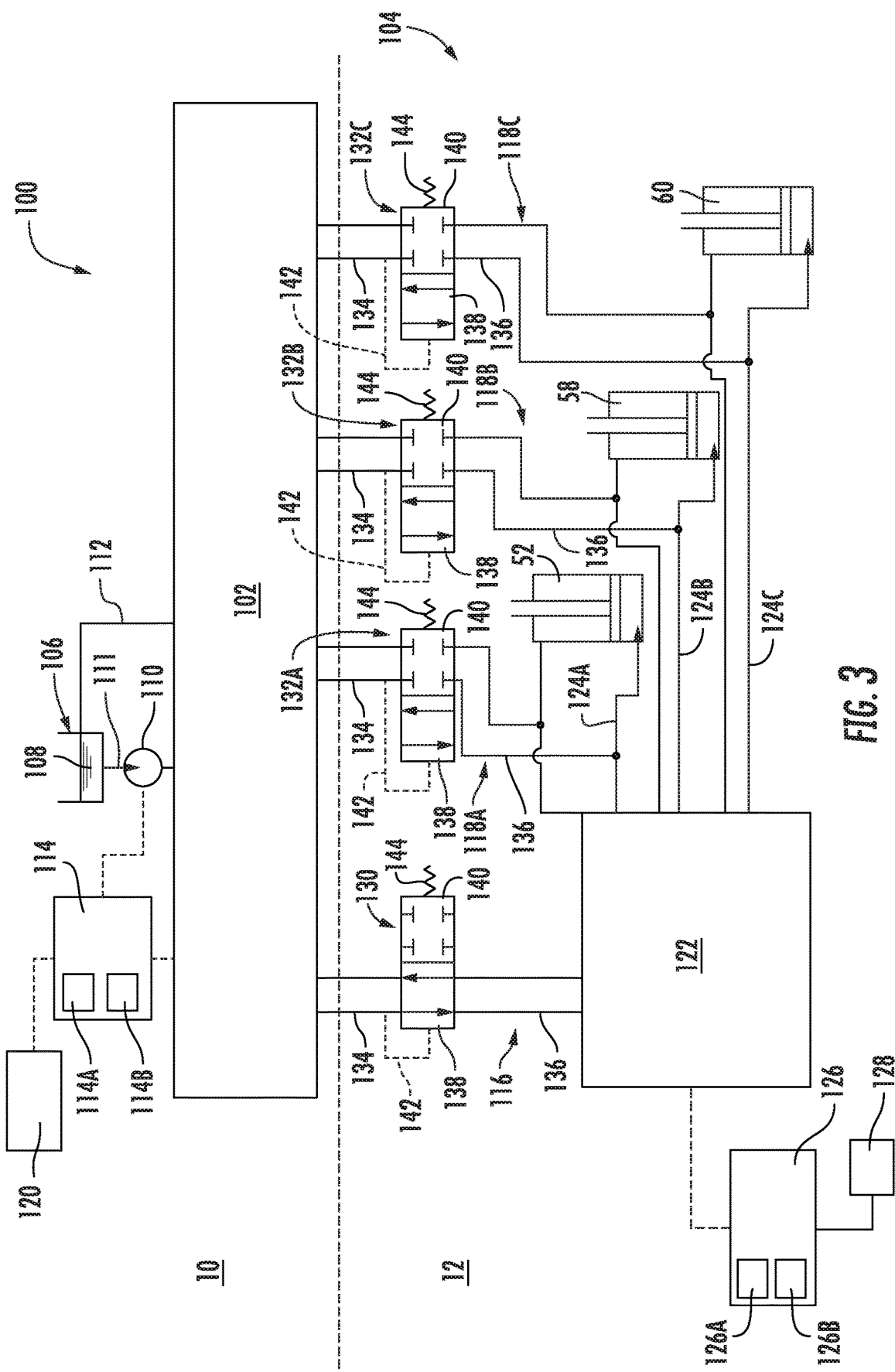
FIG. 3 illustrates a schematic view of one embodiment of a system for remotely controlling hydraulic components of an agricultural implement in accordance with aspects of the present subject matter.

Referring now to FIG. 3, a schematic view of one embodiment of a system 100 for remotely controlling hydraulic components of an agricultural implement is illustrated in accordance with aspects of the present subject matter. Specifically, the system 100 allows for automatic implement-based control (hereinafter referred to as an "automatic control mode") of the hydraulic components of an agricultural implement to be remotely overridden when initiating manual, vehicle-based control of the hydraulic components. For purposes of discussion, the system 100 will generally be described herein with reference to the work vehicle 10 and the agricultural implement 12 described above with reference to FIGS. 1 and 2. However, it should be appreciated that the disclosed system 100 may generally be utilized with work vehicles having any other suitable vehicle configuration and/or agricultural implements having any other suitable implement configuration.

In general, the system 100 may include a vehicle-based valve assembly or block 102 (e.g., an EHR valve assembly) configured to supply pressurized fluid to a hydraulic system 104 of the implement 12, where the hydraulic system 104 includes one or more hydraulic actuators. For instance, in the illustrated embodiment, the hydraulic system 104 is shown as including the wing actuators 52, the lift actuator 58, and the leveling actuator 60 described above with reference to FIG. 2. However, it should be readily appreciated by one of ordinary skill in the art that the hydraulic system 104 may include any other suitable hydraulic actuators, including any combination of hydraulic actuators configured to perform any suitable function associated with the operation of the corresponding implement.

As shown in FIG. 3, the vehicle-based valve assembly 102 (hereinafter referred to as "vehicle valve assembly 102") may be configured to be fluidly coupled to a reservoir 106 containing pressurized fluid, e.g. hydraulic fluid 108, via a pump 110, a pump supply line 111, and associated return line 112, all of which may be supported or otherwise installed on the work vehicle 10. The operation of the vehicle valve assembly 102 may be controlled by a vehicle controller 114 of the vehicle 10 to selectively supply the hydraulic fluid 108 to one or more of a plurality of supply lines of the implement's hydraulic system 104, such as a first supply line 116, a second supply line 118A, a third supply line 118B, and a fourth supply line 118C of the hydraulic system 104. As will be described in greater detail below, the controller 114 may be configured to receive a control signal or input from an operator of the work vehicle 10 (e.g., via an associated user interface 120 of the work vehicle 10) and to consequently control the vehicle valve assembly 102 to supply the hydraulic fluid 108 to either the first supply line 116 and/or to one or more of the second, third, and fourth supply lines 118A, 118B, 118C based on the desired operating mode of the implement's hydraulic system 104.

In general, the user interface 120 may be correspond to any suitable input device(s) configured to allow the operator to provide operator inputs to the vehicle controller 114, such as a touch screen display, a keyboard, joystick, buttons, knobs, switches, and/or combinations thereof located remotely from the implement, such as within the cab 22 of the work vehicle 10. As will be described in greater detail below, the operator may provide various inputs via the user interface 120 to the vehicle controller 114 to override the automatic control mode of the implement 12 and to remotely control one or more of the implement's actuators 52, 58, 60.

In general, the vehicle controller 114 may correspond to any suitable processor-based device(s), such as a computing device or any combination of computing devices. Thus, as shown in FIG. 3, the controller 114 may generally include one or more processor(s) 114A and associated memory devices 114B configured to perform a variety of computer-implemented functions (e.g., performing the methods, steps, algorithms, calculations and the like disclosed herein with reference to FIG. 5). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 114B may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 114B may generally be configured to store information accessible to the processor(s) 114A, including data that can be retrieved, manipulated, created and/or stored by the processor(s) 114A and instructions that can be executed by the processor(s) 114A.

The hydraulic system 104 of the implement 12 further includes an implement-based valve assembly or block 122 configured to regulate the flow of hydraulic fluid 108 from the first supply line 116, fluidly coupled thereto, to each of the actuators 52, 58, 60. In this regard, the implement-based valve assembly 122 (hereinafter referred to as "implement valve assembly 122") is fluidly coupled to each of the actuators 52, 58, 60 via a respective actuator line. For example, the implement valve assembly 122 is fluidly coupled to the wing actuator 52 through a first actuator line 124A, to the lift actuator 58 through a second actuator line 124B, and to the leveling actuator 60 through a third actuator line 124C.

Additionally, as shown in the illustrated embodiment, the second, third, and fourth supply lines 118A, 118B, 118C of the hydraulic system 104 may be fluidly coupled to respective ones of the first, second and third actuator lines 124A, 124B, 124C downstream of the implement valve assembly 122. For example, the second supply line 118A is fluidly coupled to the first actuator line 124A downstream of the implement valve assembly 122 while the third supply line 118B is fluidly coupled to the second actuator line 124B downstream of the implement valve assembly 122. Similarly, the fourth supply line 118C is fluidly coupled to the third actuator line 124C downstream of the implement valve assembly 122. Thus, as will be discussed in further detail below, hydraulic fluid 108 may be provided to the actuators 52, 58, 60 through the second, third and fourth supply lines 118A, 118B, 118C independently of the implement valve assembly 122.

The operation of the implement valve assembly 122 may be controlled by an implement controller 126 configured the same as or similar to the vehicle controller 114 described above, such that the implement controller 126 may generally include one or more processor(s) 126A and associated memory devices 126B configured the same as, or similar to, the processors 114A and memory devices 114B respectively. The implement controller 126 may be configured to receive signals or feedback from one or more sensors 128 (e.g., proximity sensors, position sensors, speed sensors and/or the like), such that the implement controller 126 may operate the implement valve assembly 122 based on the feedback from the sensors 128 to automatically control the operation of the implement 12 (i.e., actuation of the actuators 52, 58, 60), when the implement 12 is operating in an automatic control mode. In one embodiment, the implement controller 126 is not communicatively connected to the vehicle controller 114, such that the implement controller 126 may act fully independently of the vehicle controller 114. However, in other embodiments, a communicative link may be provided between the implement controller 126 and the vehicle controller 114.

According to one aspect of the present subject matter, a plurality of override valves are supported on the implement 12, with each override valve being fluidly coupled to a respective one of the supply lines 116, 118A, 118B, 118C of the hydraulic system 104 to facilitate override control of the operation of the actuators 52, 58, 60 by the vehicle valve assembly 102 when desired. Specifically, a first override valve 130 is fluidly coupled to the first supply line 116 between the vehicle valve assembly 102 and the implement valve assembly 122. Additionally, a second override valve 132A is fluidly coupled to the second supply line 118A between the vehicle valve assembly 102 and the wing actuator 52, a third override valve 132B is fluidly coupled to the third supply line 118B between the vehicle valve assembly 102 and the lift actuator 58, and a fourth override valve 132C is fluidly coupled to the fourth supply line 118C between the vehicle valve assembly 102 and the leveling actuator 60. Each of the supply lines 116, 118A, 118B, 118C may further include an upstream line portion 134 and a downstream line portion 136, with each respective override valve 130, 132A, 132B, 132C being fluidly coupled to the respective supply lines 116, 118A, 118B, 118C between the upstream and downstream line portions 134, 136. In one embodiment, each override valve 130, 132A, 132B, 132C may correspond to a two position valve. As such, each valve 130, 132A, 132B, 132C may include a first position 138 and a second position 140, with the first position 138 corresponding to an open position and the second position 140 corresponding to a closed position. In such an embodiment, each valve 130, 132A, 132B, 132C may be actuatable between the first and second positions 138, 140 to initiate or cut-off, respectively, the supply of hydraulic fluid through its respective supply line 116, 118A, 118B, 118C. For example, when in the open position, hydraulic fluid 108 is transmitted from the upstream line portion 134 of the respective supply line 116, 118A, 118B, 118C through the associated valve to the downstream line portion 136 of such supply line for subsequent delivery to the corresponding actuator line. Similarly, when in the closed position, hydraulic fluid 108 is prevented from being transmitted through each valve.

It may be appreciated that, when each valve is moved to its "open position," a substantial amount of the hydraulic fluid 108 may be allowed to pass through the override valve 130, 132A, 132B, 132C to the downstream line portion 136 of the respective supply line. However, the valve 130, 132A, 132B, 132C may not be fully open, such that an insignificant amount of the hydraulic fluid 108 may be prevented from flowing through the valve without affecting the operation of the system 100. Similarly, when each override valve 130, 132A, 132B, 132C is moved to its "closed position," a substantial amount of the hydraulic fluid 108 may be prevented from passing through the valve to the downstream line portion 136 of the respective supply line. However, the valve 130, 132A, 132B, 132C may not be fully closed, such that an insignificant amount of leakage of the hydraulic fluid 108 may be allowed through the valve 130, 132A, 132B, 132C without affecting the operation of the system 100.

Additionally, in one embodiment, each override valve 130, 132A, 132B, 132C may correspond to a proportional valve configured to be actuatable to any position between the open and closed positions.

In several embodiments, each override valve 130, 132A, 132B, 132C corresponds to a spring-biased, pilot-operated valve. In such embodiments, as shown in FIG. 3, a pilot line 142 may be fluidly coupled between each override valve 130, 132A, 132B, 132C and its respective supply line 116, 118A, 118B, 118C such that the pilot line 142 receives a portion of any hydraulic fluid flowing through the respective supply line upstream of the associated valve. Thus, when hydraulic fluid 108 is supplied to a respective one of the supply lines 116, 118A, 118B, 118C, a portion of the pressurized hydraulic fluid may be diverted through the associated pilot line 142 to bias or actuate the corresponding override valve 130, 132A, 132B, 132C (e.g., against the biasing force of an associated spring 144) into its open or first position 138. However, when the supply of hydraulic fluid 108 through the respective supply line 116, 118A, 118B, 118C is cut-off, the biasing spring 144 may be configured to bias the associated override valve 130, 132A, 132B, 132C back to its closed or second position 140. As such, it should be appreciated that the second position 140 of each override valve may generally correspond to the valve's neutral position.

Accordingly, when the hydraulic system 104 of the implement 12 is operating in its automatic control mode, the vehicle valve assembly 102 is configured to supply hydraulic fluid to the implement 10 via the first supply line 116 and cut-off the supply of hydraulic fluid through the second, third, and fourth supply lines 118A, 118B, 118C. As such, the override valves 130, 132A, 132B, 132C may be hydraulically actuated or spring-biased to their respective positions such that the supply of the hydraulic fluid 108 to the actuators 52, 58, 60 can be regulated via control of the operation of the implement valve assembly 122. Specifically, given the supply of pressurized hydraulic fluid through the first supply line 116, the first override valve 130 may be actuated to its open or first position 138 while the second, third, and fourth override valves 132A, 132B, 132C may be biased back into their closed or second positions 140. The operation of the implement valve assembly 122 may then be controlled by the implement controller 122 to regulate the flow of fluid each respective actuator 52, 58, 60.

However, when a user indicates, e.g. via the remote user interface 120, that a manual override mode, or override of the automatic control mode, for one or more of the actuators 52, 58, 60 is desired, the user interface 120 generates a control input which is received by the vehicle controller 114. The vehicle controller 114 consequently controls the vehicle valve assembly 102 to supply the hydraulic fluid 108 to the supply line (e.g., one or more of the second, third, and fourth supply lines 118A, 118B, 118C) corresponding to the respective actuators 52, 58, 60 for which manual control was indicated at the user interface 120 and to discontinue supply of the hydraulic fluid 108 to the first supply line 116. In such instance, the respective position of each override valve 130, 132A, 132B, 132C is adjusted (i.e., from the opened position to the closed position or vice versa) such that the supply of the hydraulic fluid 108 to the associated actuator(s) is instead regulated by the vehicle valve assembly 102. For example, when in the override control mode, the first override valve 130 is biased back into its closed position given the lack of pressurized hydraulic fluid within the first supply line 116. In contrast, the selected override valve (e.g., one or more of the second, third and fourth override valves 132A, 132B, 132C) is actuated to its open position to allow the flow of pressurized hydraulic fluid 108 therethrough.

Accordingly, based on the system configuration described above, the flow of hydraulic fluid 108 to the implement valve assembly 122 is discontinued when the operator provides an input instructing the vehicle controller 114 to override the implement's automatic control mode such that the implement valve assembly 122 can no longer control the operation of the actuators 52, 58, 60. Therefore, the implement controller 126 is effectively prevented from interfering with manual override control of the actuators 52, 58, 60 when the manual override mode is requested. Thus, communication between the vehicle controller 114 and the implement controller 126 is not required to allow the vehicle controller 114 to override the automatic control of the implement controller 126 and to remotely control the operation of the implement 12.

Figure 4:
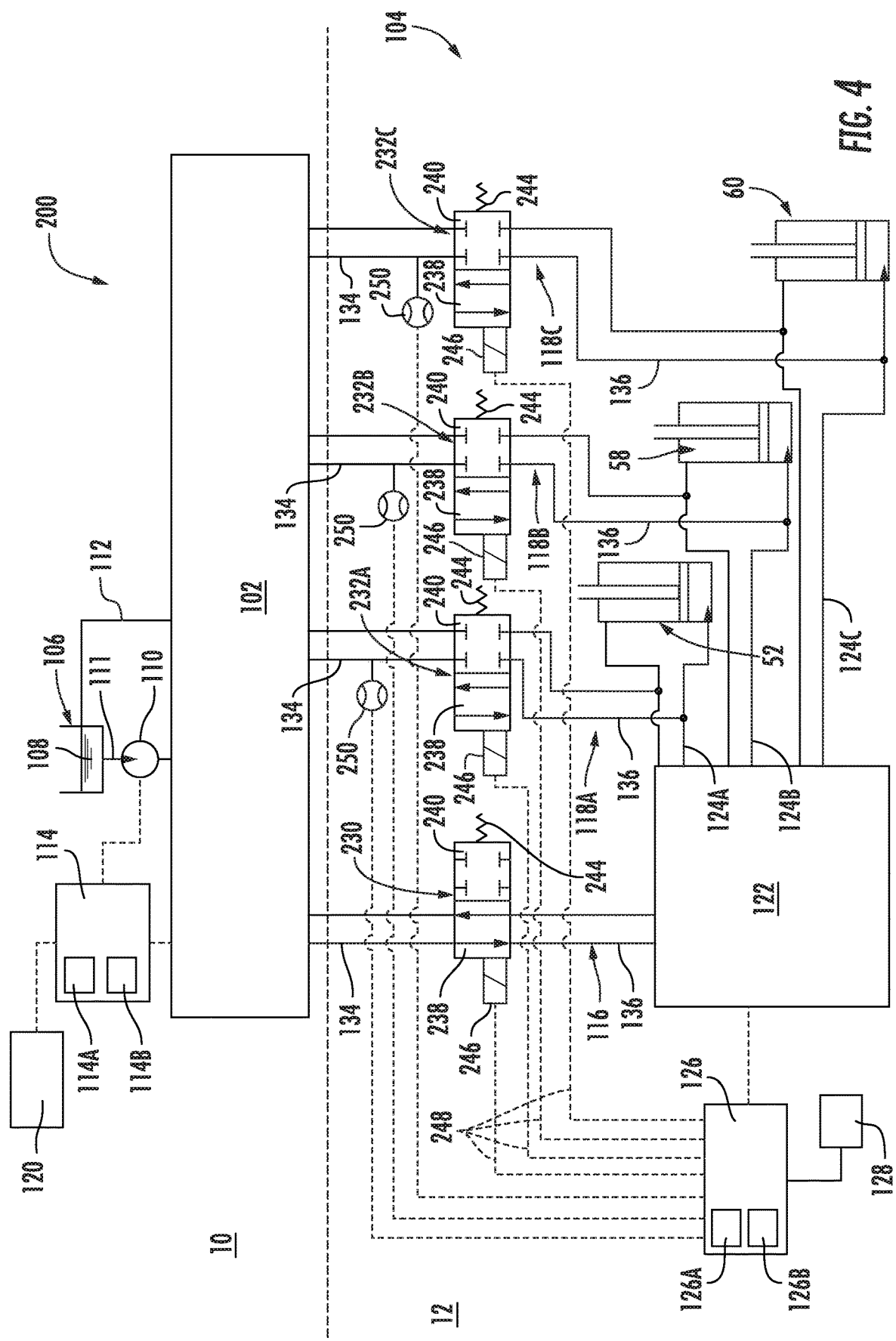
FIG. 4 illustrates a schematic view of a further embodiment of a system for remotely controlling hydraulic components of an agricultural implement in accordance with aspects of the present subject matter.

Referring now to FIG. 4, a schematic view of another embodiment of a system 200 for remotely controlling hydraulic components of an agricultural implement is illustrated in accordance with aspects of the present subject matter. Specifically, the system 100 allows for overriding automatic control of the hydraulic components of an agricultural implement to be overridden when initiating manual, vehicle-based control of the hydraulic components. For purposes of discussion, the system 200 will generally be described herein with reference to the work vehicle 10 and the agricultural implement 12 described above with reference to FIGS. 1 and 2. However, it should be appreciated that the disclosed system 100 may generally be utilized with work vehicles having any other suitable vehicle configuration and/or agricultural implements having any other suitable implement configuration.

In the embodiment illustrated in FIG. 4, the system 200 is generally configured the same as or similar to the system 100 described above with reference to the embodiment shown in FIG. 3. However, unlike the pilot-operated override valves 130, 132A, 132B, 132C of the system 100, the system 200 includes solenoid-operated override valves fluidly coupled to the respective supply lines 116, 118A, 118B, 118C in substantially the same or similar manner as the pilot-operated override valves 130, 132A, 132B, 132C described above. For example, the system 200 may include a first solenoid-operated override valve 230 that is fluidly coupled to the first supply line 116 between the vehicle valve assembly 102 and the implement valve assembly 122, a second solenoid-operated override valve 232A that is fluidly coupled to the second supply line 118A between the vehicle valve assembly 102 and the wing actuator 52, a third solenoid-operated override valve 232B that is fluidly coupled to the third supply line 118B between the vehicle valve assembly 102 and the lift actuator 58, and a fourth solenoid-operated override valve 232C that is fluidly coupled to the fourth supply line 118C between the vehicle valve assembly 102 and the leveling actuator 60. Each respective solenoid-operated override valve 230, 232A, 232B, 232C may further be fluidly coupled to the respective supply lines 116, 118A, 118B, 118C between its upstream and downstream line portions 134, 136. Additionally, similar to the pilot-operated override valves 130, 132A, 132B, 132C described above, each solenoid-operated override valve 230, 232A, 232B, 232C includes an open or first position 238, a closed or second position 240, and a spring 244 configured to bias its respective valve towards the neutral or second position 240.

As shown in FIG. 4, each solenoid-operated override valve 230, 232A, 232B, 232C generally includes an actuating mechanism, such as a solenoid 246. The solenoid 246 may be configured to receive a signal, i.e., an input, from the implement controller 126, such as through solenoid wires 248 or through a wireless arrangement (not shown). Upon receiving an input from the implement controller 126, the solenoid 246 may be configured to actuate the respective solenoid-operated override valve 230, 232A, 232B, 232C from its closed or second position 240 to its open or first position 238.

Additionally, in the embodiment shown in FIG. 4, a sensor 250, such as a flow or pressure sensor, may be fluidly coupled to each of the second, third and fourth supply lines 118A, 118B, 118C. As shown in FIG. 4, each sensor 250 may be coupled to the upstream line portion 134 of the respective supply line 118A, 118B, 118C at a location upstream of the respective second, third or fourth solenoid-operated override valve 132A, 132B, 132C. As such, each sensor 250 may be configured to detect a flow parameter, such as the fluid pressure, of the hydraulic fluid 108 supplied to the respective supply line 118A, 118B, 118C. The implement controller 126 may be configured to receive and monitor signals from the sensors 250 and to determine if there has been a change in the flow parameter of the fluid supplied through one or more of the second, third and fourth supply lines 118A, 118B, 118C. For example, the controller 126 may be configured to monitor the sensor data to determine when the supply of hydraulic fluid to one or more of the supply lines 118A, 118B, 118C has been initiated or cut-off. Generally, if a change in the flow parameter associated with the hydraulic fluid 108 supplied through one or more of the second, third and fourth supply lines 118A, 118B, 118C is detected, the implement controller 126 is configured to adjust the positions of the solenoid-operated override valves 230, 232A, 232B, 232C, as necessary, to achieve desired operation of the system 200 (i.e., operation within the automatic control mode or the override control mode).

For example, when the implement 12 is operating in the automatic control mode, the solenoid-operated override valves 230, 232A, 232B, 232C may be automatically actuated or spring-biased to their respective positions such that the supply of the hydraulic fluid 108 to the actuators 52, 58, 60 can be regulated via control of the operation of the implement valve assembly 122. Specifically, the first solenoid-operated valve 230 is actuated to its open position and the second, third and fourth solenoid-operated valves 230, 232A, 232B, 232C are actuated to their closed position when the implement 12 is operating in the automatic control mode. The operation of the implement valve assembly 122 may then be controlled by the implement controller 122 to regulate the flow of fluid each respective actuator 52, 58, 60.

However, when a user indicates, e.g. via the user interface 120, that the manual override mode, or override of the automatic control mode, for one or more of the actuators 52, 58, 60 is desired, the user interface 120 generates a control input which is received by the vehicle controller 114. The vehicle controller 114 consequently controls the vehicle valve assembly 102 to supply the hydraulic fluid 108 to the supply line (e.g., one or more of the second, third, and fourth supply lines 118A, 118B, 118C) corresponding to the respective actuators 52, 58, 60 for which manual control was indicated at the user interface 120. When the flow of the hydraulic fluid 108 is initiated through one or more of the second, third and fourth supply lines 118A, 118B, 118C, such fluid flow through the line(s) may be detected by the implement controller 126 (e.g., via the associated sensor 250). The controller 145 may then generate and send a signal to the solenoid 246 of the first solenoid-operated override valve 230 to shift the first solenoid-operated override valve 230 into the closed position against the bias of the spring 244. Additionally, the implement controller 126 will generate and send signals to the appropriate solenoid(s) 246 to shift the solenoid-operated valve(s) 232A, 232B, 232C corresponding to the affected supply lines 118A, 118B, 118C against the bias of the respective springs 244 into the open position.

It should be appreciated that, in the embodiment shown in FIG. 4, the vehicle valve assembly 102 need not discontinue the supply of hydraulic fluid 108 to the first supply line 116 when transitioning to the override control valve. Instead, the vehicle valve assembly 102 only needs to supply the hydraulic fluid 108 to one or more of the second, third, and fourth supply lines 118A, 118B, 118C, such that the controller 145 senses the supply of fluid through such supply line(s) and reactively closes the first solenoid-operated override valve 230, thereby shutting off the supply of hydraulic fluid 108 to the implement valve assembly 122. However, it may be appreciated that the vehicle valve assembly 102 may additionally discontinue the supply of hydraulic fluid 108 to the first supply line 116, as in the embodiment shown in FIG. 3. In either case, the flow of hydraulic fluid 108 to the implement valve assembly 122 is discontinued when the supply of hydraulic fluid 108 to one or more of the second, third and fourth supply lines 118A, 118B, 118C is initiated such that the implement valve assembly 122 can no longer control the operation of the actuators 52, 58, 60. Thus, communication between the vehicle controller 114 and the implement controller 126 is not required to allow the vehicle controller 114 to override the operation of the implement controller 126 and to remotely control the implement 12 in the manual override mode.

It should be appreciated that the above configurations of the override valves as presented in FIGS. 3 and 4 should not be construed as limiting. Instead, the override valves may be configured as any suitable type of valve and in any combination that allows the disclosed systems 100, 200 to function as described herein, such as a combination of pilot-operated and solenoid-operated override valves.

Figure 5:
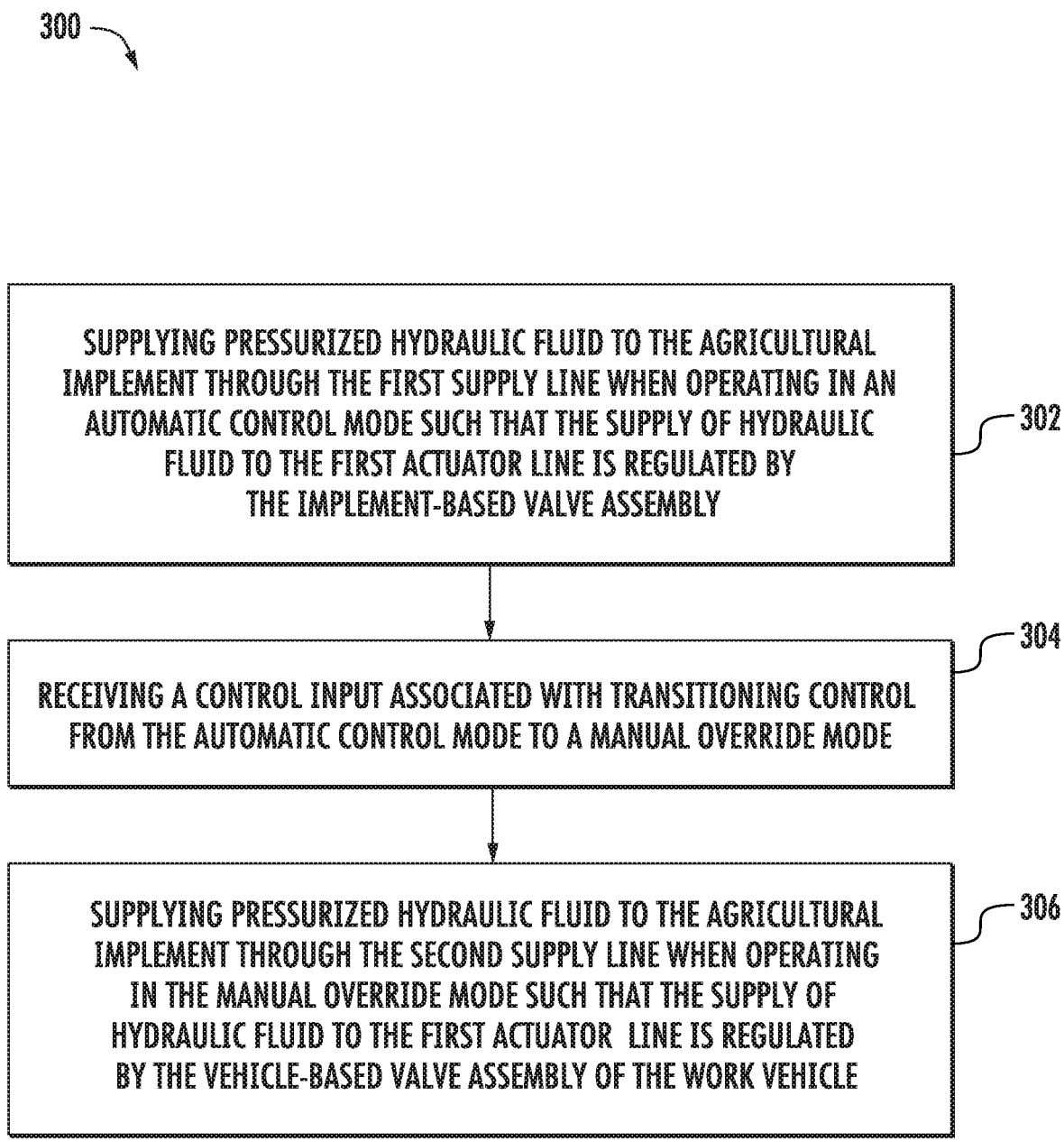
FIG. 5 illustrates a flow diagram of one embodiment of a method for remotely controlling hydraulic components of an agricultural implement in accordance with aspects of the present subject matter.

Referring now to FIG. 5, a flow diagram of one embodiment of a method 300 for remotely controlling hydraulic components of an agricultural implement is illustrated in accordance with aspects of the present subject matter. In general, the method 300 will be described herein with reference to the implement 12 and the work vehicle 10 shown in FIGS. 1 and 2 as well as the respective systems 200, 300 shown in FIGS. 3 and 4. However, it should be appreciated that the disclosed method 300 may be executed with implements and/or work vehicles having any other suitable configurations and/or with systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

As will be described in detail below, in one embodiment, the disclosed method 300 may be suitable for operating the agricultural implement 12. As previously discussed, the implement 12 generally includes the first and second supply lines 116, 118A configured to receive pressurized hydraulic fluid 108 from the vehicle-based valve assembly 102 of the work vehicle 10. The first supply line 116 is fluidly coupled to the implement-based valve assembly 122 configured to regulate a supply of the hydraulic fluid 108 supplied via the first supply line 116 to the first actuator line 124A fluidly coupled to one of the actuators 52, 58, 60 of the agricultural implement 12. The second supply line 118A is fluidly coupled to the first actuator line 124A downstream of the implement-based valve assembly 122. Additionally, the agricultural implement 12 further includes the first override valve 130, 230 fluidly coupled to the first supply line 116 upstream of the implement-based valve assembly 122 and the second override valve 132A, 232A fluidly coupled to the second supply line 118A.

As shown in FIG. 5, at (302), the method 300 may include supplying pressurized hydraulic fluid to an agricultural implement through a first supply line when operating in an automatic control mode such that the flow of hydraulic fluid supplied to a first actuator line is regulated by an implement-based valve assembly. For example, as indicated above, when the implement 12 is operating in the automatic control mode, the implement valve assembly 122 is supplied the pressurized hydraulic fluid 108 through the first supply line 116 when the first override valve 130, 230 is in the open position and the second override valve 132A, 232A is in the closed position. Where there are further actuator lines, such as second and third actuator lines 124B, 124C, the third and fourth override valves 132B, 132C may also be in the closed position when the implement 12 is operating in the automatic control mode.

Additionally, at (304), the method may include receiving an input associated with transitioning control from the automatic control mode to a manual override mode. For example, as indicated above, an input or signal generated by a user's interaction with the user interface 120 indicating that a manual override mode, or override of the automatic control mode, for one or more of the actuators 52, 58, 60 is desired, e.g., by requesting folding of the wings, may be received by the vehicle controller 114.

Moreover, at (306), the method may include supplying pressurized hydraulic fluid to the agricultural implement through the second supply line when operating in the manual override mode such that the flow of hydraulic fluid supplied to the first actuator line is regulated by the vehicle-based valve assembly of the work vehicle. Specifically, as indicated above, the second supply line 118A (and/or one or more further supply lines, such as one or more of the third and fourth supply lines 118B, 118C) corresponding to the actuator 52, 58, 60 for which manual override control is desired is supplied the hydraulic fluid 108. The second supply line 118 is connected to the first actuator line 124A downstream of the implement-based valve assembly 122 such that the vehicle valve assembly 102 controls the actuator 52, 58, 60.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for remotely controlling hydraulic components of an agricultural implement, the system comprising:

a vehicle-based valve assembly configured to regulate a supply of hydraulic fluid to the agricultural implement through first and second supply lines, the vehicle-based valve assembly configured to supply the hydraulic fluid through the first supply line when a hydraulic system of the implement is operating in an automatic control mode;

an implement-based valve assembly fluidly coupled to the first supply line, the implement-based valve assembly configured to regulate the supply of the hydraulic fluid received via the first supply line to a first actuator line fluidly coupled to a first hydraulic actuator of the agricultural implement when in the automatic control mode, the second supply line being fluidly coupled to the first actuator line downstream of the implement-based valve assembly;

a first override valve supported on the agricultural implement and fluidly coupled to the first supply line between the vehicle-based valve assembly and the implement-based valve assembly; and a second override valve supported on the agricultural implement and fluidly coupled to the second supply line between the vehicle-based valve assembly and the first actuator line; wherein:

when operating in the automatic control mode, the first and second override valves are actuated to respective positions such that the supply of the hydraulic fluid to the first hydraulic actuator through the first actuator line is regulated via control of the implement-based valve assembly; and when a control input is received to override the automatic control mode, the first and second override valves are actuated to respective positions such that the supply of the hydraulic fluid to the first hydraulic actuator through the first actuator line is regulated by the vehicle-based valve assembly.

2. The system of claim 1, wherein the first and second override valves correspond to pilot-operated valves such that each of the first and second override valves are actuated to an open position when the hydraulic fluid is supplied through the first and second supply lines, respectively, and to a closed position when the supply of the hydraulic fluid to the first and second supply lines, respectively, is discontinued.

3. The system of claim 2, wherein the vehicle-based valve assembly is configured to discontinue the supply of the hydraulic fluid to the first supply line and to initiate the supply of the hydraulic fluid through the second supply line when the control input is received to override the automatic control mode.

4. The system of claim 1, further comprising:
a pressure sensor configured to detect a fluid pressure of the hydraulic fluid supplied through the second supply line; and
an implement controller configured to monitor the fluid pressure within the second supply line based on sensor data received from the pressure sensor.

5. The system of claim 4, wherein, when the vehicle-based valve assembly initiates the supply of the hydraulic fluid through the second supply line upon receipt of the control input, the implement controller is configured to detect a change in the fluid pressure within the second supply line and to actuate the second override valve to an open position to allow the hydraulic fluid to be supplied to the first actuator line via the second supply line.

6. The system of claim 5, wherein, when the implement controller detects the change in the fluid pressure within the second supply line, the implement controller is further configured to actuate the first override valve to a closed position.

7. The system of claim 4, wherein, when the vehicle-based valve assembly initiates the supply of the hydraulic fluid through the second supply line upon receipt of the control input, the implement controller is configured to detect a change in the fluid pressure within the second supply line and to actuate the first override valve to a closed position to prevent the supply of the hydraulic fluid to the implement-based valve assembly through the first supply line.

8. The system of claim 1, wherein the implement-based valve assembly is further configured to regulate the supply of the hydraulic fluid through the first supply line to a second actuator line fluidly coupled to a second hydraulic actuator of the agricultural implement when in the automatic control mode, and wherein the vehicle-based valve assembly is further configured to regulate the supply of the hydraulic fluid to the agricultural implement through a third supply line fluidly coupled to the second actuator line downstream of the implement-based valve assembly, the system further comprising:
a third override control valve supported on the agricultural implement and fluidly coupled to the third supply line between the vehicle-based valve assembly and the second actuator line.

9. The system of claim 8, wherein:
when operating in the automatic control mode, the first override valve is disposed at an open position and the second and third valves are disposed at closed positions such that the supply of the hydraulic fluid to at least one of the first hydraulic actuator or the second hydraulic actuator is regulated via control of the operation of the implement-based valve assembly; and when the control input is received to override the automatic control mode, the first override valve is actuated to a closed position and at least one of the second override valve or the third override valve is actuated to an open position such that the supply of the hydraulic fluid to the at least one of the first hydraulic actuator or the second hydraulic actuator is regulated by the vehicle-based valve assembly.

10. The system of claim 1, wherein the control input is transmitted based on an operator input received from an input device within a cab of a work vehicle to which the agricultural implement is coupled.

11. A method for remotely controlling hydraulic components of an agricultural implement towed by a work vehicle, the agricultural implement including first and second supply lines configured to receive pressurized hydraulic fluid from a vehicle-based valve assembly of the work vehicle, the first supply line being fluidly coupled to an implement-based valve assembly configured to regulate a supply of the hydraulic fluid supplied via the first supply line to a first actuator line fluidly coupled to a first hydraulic actuator of the agricultural implement, the second supply line being fluidly coupled to the first actuator line downstream of the implement-based valve assembly, the agricultural implement further comprising a first override valve fluidly coupled to the first supply line upstream of the implement-based valve assembly and a second override valve fluidly coupled to the second supply line, the method comprising:
supplying the pressurized hydraulic fluid to the agricultural implement through the first supply line when operating in an automatic control mode such that the supply of the hydraulic fluid to the first actuator line is regulated by the implement-based valve assembly, the first override valve being in an open position and the second override valve being in a closed position when in the automatic control mode;

receiving a control input associated with transitioning control from the automatic control mode to a manual override mode; and supplying the pressurized hydraulic fluid to the agricultural implement through the second supply line when operating in the manual override mode such that the supply of the hydraulic fluid to the first actuator line is regulated by the vehicle-based valve assembly of the work vehicle.

12. The method of claim 11, further comprising:
discontinuing, with the vehicle-based valve assembly, the supply of the hydraulic fluid to the first supply line when the control input is received to override the automatic control mode.

13. The method of claim 12, wherein the first and second override valves correspond to pilot-operated valves such that each of the first and second override valves are actuated to the open position when the hydraulic fluid is supplied through the first and second supply lines, respectively, and to the closed position when the supply of the hydraulic fluid to the first and second supply lines, respectively, is discontinued.

14. The method of claim 11, further comprising:
monitoring, with an implement-based controller, sensor data from a pressure sensor configured to detect a fluid pressure of the hydraulic fluid supplied through the second supply line; and
detecting, with the implement controller, a change in the fluid pressure within the second supply line.

15. The method of claim 14, further comprising:
actuating, with the implement-based controller, the second override valve to the open position to allow the hydraulic fluid to be supplied to the first actuator line via the second supply line when the change in the fluid pressure within the second supply line is detected.

16. The method of claim 15, further comprising:
actuating, with the implement-based controller, the first override valve to the closed position to prevent the supply of the hydraulic fluid to the first actuator line via the first supply line when the change in the fluid pressure within the second supply line is detected.

17. The method of claim 14, further comprising:
actuating, with the implement controller, the first override valve to the closed position to prevent the supply of the hydraulic fluid to the implement-based valve assembly via the first supply line when the change in the fluid pressure within the second supply line is detected.

18. The method of claim 11, further comprising:
regulating, with the implement-based valve assembly, the supply of the hydraulic fluid through the first supply line to a second actuator line fluidly coupled to a second hydraulic actuator of the agricultural implement when in the automatic control mode; and
regulating, with the vehicle-based valve assembly, the supply of the hydraulic fluid to the agricultural implement through a third supply line fluidly coupled to the second actuator line downstream of the implement-based valve assembly when in the manual override mode, wherein a third override control valve is supported on the agricultural implement and is fluidly coupled to the third supply line between the vehicle-based valve assembly and the second actuator line.

19. The method of claim 18, wherein:
when operating in the automatic control mode, the first override valve is disposed at the open position and the second and third valves are disposed at closed positions such that the supply of the hydraulic fluid to at least one of the first hydraulic actuator or the second hydraulic actuator is regulated via control of the implement-based valve assembly; and
when the control input is received to override the automatic control mode, the first override valve is actuated to the closed position and at least one of the second override valve or the third override valve is actuated to the open position such that the supply of the hydraulic fluid to the at least one of the first hydraulic actuator or the second hydraulic actuator is regulated by the vehicle-based valve assembly.

20. The method of claim 11, wherein the control input is transmitted based on an operator input received from an input device within a cab of a work vehicle to which the agricultural implement is coupled.

* * * * *